US010404095B2

(12) United States Patent
Sakamoto et al.

(10) Patent No.: US 10,404,095 B2
(45) Date of Patent: Sep. 3, 2019

(54) UNINTERRUPTIBLE POWER SUPPLY UNIT

(71) Applicant: FDK CORPORATION, Tokyo (JP)

(72) Inventors: Jinichi Sakamoto, Tokyo (JP); Takashi Kabasawa, Tokyo (JP)

(73) Assignee: FDK CORPORATION, Tokyo (JP)

( * ) Notice: Subject to any disclaimer, the term of this patent is extended or adjusted under 35 U.S.C. 154(b) by 84 days.

(21) Appl. No.: 15/308,332

(22) PCT Filed: Apr. 22, 2015

(86) PCT No.: PCT/JP2015/062252
§ 371 (c)(1),
(2) Date: Nov. 1, 2016

(87) PCT Pub. No.: WO2015/198704
PCT Pub. Date: Dec. 30, 2015

(65) Prior Publication Data
US 2017/0063150 A1 Mar. 2, 2017

(30) Foreign Application Priority Data
Jun. 25, 2014 (JP) ................................ 2014-130334

(51) Int. Cl.
*H02J 9/06* (2006.01)
*H01M 10/44* (2006.01)
(Continued)

(52) U.S. Cl.
CPC ........... *H02J 9/061* (2013.01); *H01M 10/425* (2013.01); *H01M 10/44* (2013.01); *H01M 10/46* (2013.01);
(Continued)

(58) Field of Classification Search
CPC .......... H02J 7/00; H02J 7/0014; H02J 7/0068; H02J 7/0052; H02J 9/06; H02J 9/061;
(Continued)

(56) References Cited

U.S. PATENT DOCUMENTS

2002/0014880 A1 2/2002 McAndrews
2010/0213887 A1* 8/2010 Louch ...................... H02J 7/35 320/101
(Continued)

FOREIGN PATENT DOCUMENTS

JP 03-056042 A 11/1991
JP 2009-095123 A 4/2009
(Continued)

OTHER PUBLICATIONS

International Search Report (including English translation) and Written Opinion dated Jul. 21, 2015, for corresponding PCT Application No. PCT/JP2015/062252.
(Continued)

*Primary Examiner* — Fritz M Fleming
*Assistant Examiner* — Jagdeep S Dhillon
(74) *Attorney, Agent, or Firm* — Kinney & Lange, P.A.

(57) ABSTRACT

An uninterruptible power supply unit is configured such that, during charging of a first battery pack, and until, after the first battery pack is charged to a fully charged state, the voltage of the first battery pack is lowered below an upper limit voltage of a load device, discharging of the first battery pack is prohibited, and discharging of the second battery pack is allowed, and such that, during charging of a second battery pack, and until, after the second battery pack is charged to a fully charged state, the voltage of the second battery pack is lowered below the upper limit voltage of the load device, discharging of the second battery pack is prohibited, and discharging of the first battery pack is allowed.

11 Claims, 3 Drawing Sheets

(51) Int. Cl.
*H01M 10/42* (2006.01)
*H02J 7/00* (2006.01)
*H01M 10/46* (2006.01)
*H02J 7/34* (2006.01)
*H01M 10/34* (2006.01)

(52) U.S. Cl.
CPC .......... *H02J 7/0021* (2013.01); *H02J 7/0031* (2013.01); *H02J 7/0068* (2013.01); *H02J 7/34* (2013.01); *H02J 9/062* (2013.01); *H01M 10/345* (2013.01); *Y02E 60/124* (2013.01)

(58) Field of Classification Search
CPC .... H01M 10/425; H01M 10/42; H01M 10/30; H01M 10/44; H01M 10/46
USPC ........ 307/65, 43, 66, 64, 9.1, 10.1; 320/101, 320/127, 166, 167, 109
See application file for complete search history.

(56) References Cited

U.S. PATENT DOCUMENTS

2013/0106341 A1* 5/2013 Eaton .................... H01M 16/00 320/101
2014/0176076 A1* 6/2014 Momo .................... H02J 7/007 320/128
2014/0203780 A1* 7/2014 Hu ........................ H02J 7/0014 320/112
2015/0231986 A1* 8/2015 Li ........................... B60L 50/66 701/22
2015/0232083 A1* 8/2015 Yu ......................... B60W 10/06 701/22
2015/0307082 A1* 10/2015 Nallapa .................. B60L 58/12 701/22
2015/0349387 A1* 12/2015 Inaba .................... H01M 10/44 700/297

FOREIGN PATENT DOCUMENTS

JP 2012-130158 A 5/2012
JP 2012-196058 A 11/2012

OTHER PUBLICATIONS

Extended European Search Report, for European Patent Application No. 15812205.1, dated Jan. 3, 2018, 7 pages.

* cited by examiner

UNINTERRUPTIBLE POWER SUPPLY UNIT

TECHNICAL FIELD

The present invention relates to an uninterruptible power supply unit.

BACKGROUND ART

An uninterruptible power supply unit is a power supply unit configured, when electric power is not supplied to a load device from an external power supply due to power failure, and the like, to supply electric power to the load device from a secondary battery charged beforehand, in order to continue the operation of the load device. Generally, the secondary battery of the uninterruptible power supply unit is charged by the external power supply at normal time. As an example of the secondary battery used for the uninterruptible power supply unit, an alkaline secondary battery, such as for example, a nickel-hydrogen secondary battery is known.

The alkaline secondary battery has a characteristic that it needs to be charged at a voltage higher than its rated voltage. However, generally, in the uninterruptible power supply unit, the rated voltage of the alkaline secondary battery is equal to the voltage of the external power supply. For this reason, when the voltage of the external power supply is used as it is, it is not possible to charge the alkaline secondary battery up to the fully charged state by electric power from the external power supply.

For example, when a secondary battery whose rated voltage is lower than the voltage of the external power supply is used, the secondary battery can be charged up to the fully charged state by electric power of the external power supply. Further, at the time of power failure, the load device can be operated by electric power of the secondary battery in such a manner that the voltage of the secondary battery is boosted up to the voltage of the external power supply by, for example, a DC to DC converter. However, in this case, the DC/DC converter, which boosts the voltage of the secondary battery at the time of power failure, needs to be provided, which causes problems of increase in size and cost of the uninterruptible power supply unit.

As a measure to cope with the problems, there is known a backup power supply unit configured such that the rated voltage of the secondary battery is set to be equal to the voltage of the external power supply, and such that, at the time of charging, the voltage of the external power supply is boosted by a DC/DC converter, and the secondary battery is charged with the output voltage of the DC/DC converter (see, for example, Patent Document 1). According to the conventional technique configured in this way, the DC/DC converter for boosting the voltage of the secondary battery at power failure is not needed, and thereby, the size and cost of the uninterruptible power supply unit can be reduced.

PRIOR ART DOCUMENT

Patent Document

Patent Document 1: Japanese Patent Laid-Open No. 2009-95129

SUMMARY OF THE INVENTION

Problems to be Solved by the Invention

However, the above-described conventional technique is configured to supply electric power from the secondary battery to the load device via a diode or FET at power failure. That is, the conventional technique has a problem that, when electric power is supplied from the secondary battery to the load device, the electric power of the secondary battery cannot be efficiently used due to the voltage drop and power loss which arise in the diode or FET.

The present invention has been made in view of the above described circumstance, and an object of embodiments of the present invention is to provide an uninterruptible power supply unit which can efficiently use electric power of the secondary battery.

Means for Solving the Problems

First Aspect of the Present Invention

A first aspect of the present invention is an uninterruptible power supply unit that is configured by including: an input/output terminal which is connected in parallel with a power supply line supplying electric power from an external power supply to a load device; a battery unit including a first battery pack and a second battery pack, each of which has the rated voltage equal to the voltage of the external power supply; a charging circuit which boosts the voltage of the external power supply to a charging voltage of the first battery pack and the second battery pack, and charges the battery unit with the boosted voltage; a discharging circuit which, at power failure of the external power supply, discharges electric power from the battery unit to the load device via the input/output terminal; and a control unit which controls the charging circuit and the discharging circuit, and is configured such that, during the first battery pack is charged, and until, after the first battery pack is charged to a fully charged state, the voltage of the first battery pack is lowered below an upper limit voltage of the load device, the control unit prohibits discharging of the first battery pack and allows discharging of the second battery pack, and such that, during the second battery pack is charged, and until, after the second battery pack is charged to a fully charged state, the voltage of the second battery pack is lowered below the upper limit voltage of the load device, the control unit prohibits discharging of the second battery pack and allows discharging of the first battery pack.

The voltage of the alkaline secondary battery, which is charged with the charging voltage, becomes higher than the rated voltage of the alkaline secondary battery before reaching the fully charged state. Further, the voltage of the alkaline secondary battery, which is charged to the fully charged state, is substantially equal to the charging voltage immediately after the charging, and then is gradually lowered. Therefore, there is possible that, during charging and immediately after full charging of the alkaline secondary battery, the voltage of the alkaline secondary battery is higher than the upper limit voltage of the load device. Therefore, at this time, when power failure occurs, and when electric power is supplied from the alkaline secondary battery to the load device, the stoppage, failure, or the like, of the load device may be caused.

The uninterruptible power supply unit of an embodiment of the present invention is provided with the first battery pack and the second battery pack, each having a rated voltage equal to the voltage of the external power supply, and is configured to boost the voltage of the external power supply to a charging voltage of the first battery pack and the second battery pack, and to charge the battery unit with the boosted voltage. Further, during the first battery pack is charged, and until, after the first battery pack is charged to the fully charged state, the voltage of the first battery pack is lowered below the upper limit voltage of the load device, discharging of the first battery pack is prohibited, and discharging of the second battery pack is allowed. Similarly, during the second battery pack is charged, and until, after the second battery pack is charged to a fully charged state, the voltage of the second battery pack is lowered below the upper limit voltage of the load device, discharging of the second battery pack is prohibited, and discharging of the first battery pack is allowed.

With such configuration, at power failure, electric power can be always supplied to the load device from one of the first battery pack and the second battery pack, and hence, the operation of the load device can be surely continued. Further, when electric power is supplied from the battery unit to the load device at power failure, the output voltage of the battery unit is always below the upper limit voltage of the load device, and thereby, the stopping, failure, or the like, of the load device can be obviated. Further, at power failure, electric power can be directly supplied from the battery unit to the load device, and hence, the electric power of the battery unit can be efficiently used.

Thereby, according to the first aspect of the present invention, it is possible to obtain the effect of providing the uninterruptible power supply unit capable of efficiently using the electric power of the secondary battery.

Second Aspect of Present Invention

A second aspect of the present invention is an uninterruptible power supply unit configured such that, in the first aspect of the present invention, on a condition that each of the voltage of the first battery pack and the voltage of the second battery pack is below the lower limit voltage of the load device, until the voltages of the first battery pack and the second battery pack reach the upper limit voltage of the load device, the control unit simultaneously charges the first battery pack and the second battery pack and allows discharging of the first battery pack and the second battery pack.

According to the second aspect of the present invention, in the case where each of the voltage of the first battery pack and the voltage of the second battery pack is below the lower limit voltage of the load device, the first battery pack and the second battery pack are simultaneously charged, and thereby, the first battery pack and the second battery pack can be charged in a short time and efficiently. Further, during the charging, the discharging of the first battery pack and the second battery pack is allowed, and thereby, even when power failure occurs during the charging, electric power can be supplied to the load device.

Third Aspect of the Present Invention

A third aspect of the present invention is an uninterruptible power supply unit configured such that, in the second aspect of the present invention, the discharging circuit includes: a semiconductor element which is provided in a discharge path from the battery unit to the input/output terminal and lowers the voltage of the battery unit; and a bypass circuit which bypasses the semiconductor element.

In the state where the first battery pack and the second battery pack are simultaneously charged, and where discharging of each of the first battery pack and the second battery pack is allowed, when each of the voltage of the first battery pack and the voltage of the second battery pack reaches the upper limit voltage of the load device, the first battery pack and the second battery pack cannot be charged higher than the upper limit voltage.

According to the third aspect of the present invention, the semiconductor element is provided in the discharge path from the battery unit to the input/output terminal, and thereby, the first battery pack and the second battery pack can be charged until the voltage of the first battery pack and the voltage of the second battery pack become higher than the upper limit voltage of the load device, by the voltage drop arisen in the semiconductor element. Thereby, the time during the first battery pack and the second battery pack are simultaneously charged can be increased, and hence, the first battery pack and the second battery pack can be more efficiently charged. Further, in the case where, at power failure, electric power of the battery unit is supplied to the load device, the semiconductor element provided in the discharge path is bypassed. Thereby, it is possible to avoid that, at power failure, electric power of the battery unit cannot be efficiently used due to the voltage drop and power loss which are arisen in the semiconductor element.

Fourth Aspect of the Present Invention

A fourth aspect of the present invention is an uninterruptible power supply unit configured such that, in one of the first to third aspects of the present invention, in the case where, at power failure, and discharging of the first battery pack is allowed, on a condition that the voltage of the first battery pack is lowered below the lower limit voltage of the load device, the control unit allows discharging of the second battery pack, and in the case where, at power failure, and discharging of the second battery pack is allowed, on a condition that the voltage of the second battery pack is lowered below the lower limit voltage of the load device, the control unit allows discharging of the first battery pack.

In this way, one of the first battery pack and the second battery pack is allowed to be discharged, and after the voltage of the one of the first battery pack and the second battery pack is lowered below the lower limit voltage of the load device, the other of the first battery pack and the second battery pack is allowed to be discharged. Thereby, the opportunity of additional charging of the first battery pack or the second battery pack can be reduced. Therefore, according to the fourth aspect of the present invention, the possibility of a temporary voltage drop caused by the memory effect of the battery unit can be reduced.

Advantageous Effects of the Invention

According to embodiments of the present invention, it is possible to provide the uninterruptible power supply unit which can efficiently use electric power of the secondary battery.

MODE FOR CARRYING OUT THE INVENTION

In the following, an embodiment according to the present invention will be described with reference to the accompanying drawings.

It should be noted that the present invention is not intended to be limited to the embodiment described below, and of course, various modifications are possible within the scope of the invention described in the claims.

Configuration of Uninterruptible Power Supply Unit 10

A configuration of an uninterruptible power supply unit 10 according to an embodiment of the present invention will be described with reference to FIG. 1.

Figure 1:
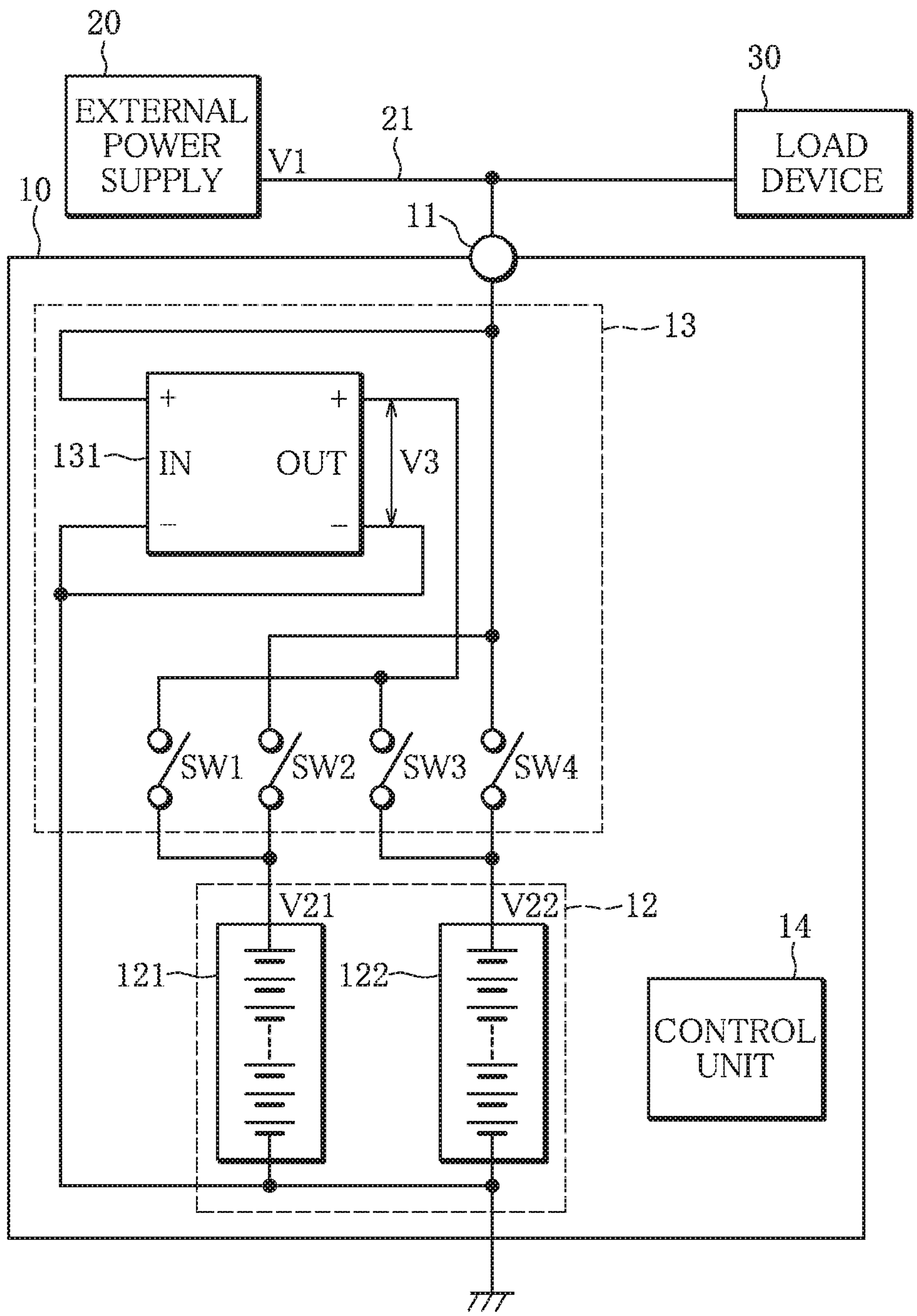
FIG. 1 is a circuit diagram illustrating a configuration of an uninterruptible power supply unit according to an embodiment of the present invention.

FIG. 1 is a circuit diagram illustrating the configuration of the uninterruptible power supply unit 10.

The uninterruptible power supply unit 10 is a power supply unit which, when electric power cannot be supplied from an external power supply 20 to a load device 30 due to power failure, or the like, supplies electric power to the load device 30 in order to continue the operation of the load device 30.

The uninterruptible power supply unit 10 includes an input/output terminal 11, a battery unit 12, a charge/discharge circuit 13, and a control unit 14.

The input/output terminal 11 is connected in parallel to a power supply line 21 which supplies electric power from the external power supply 20 to the load device 30. Here, the external power supply 20 is, for example, a power supply unit which converts commercial AC power to DC power with a voltage V1. Further, the load device 30 is an electronic device which is operated by the DC power with the voltage V1.

The battery unit 12 includes a first battery pack 121 and a second battery pack 122, each of which is configured by connecting alkaline secondary batteries, such as nickel-hydrogen secondary batteries in series or in parallel. Each of the first battery pack 121 and the second battery pack 122 is a battery power supply, the rated voltage of which is equal to the voltage V1 of the external power supply 20. Further, the battery unit 12 includes a circuit (not shown) which detects the voltage and temperature of each of the first battery pack 121 and the second battery pack 122.

The charge/discharge circuit 13, as a "charging circuit" and a "discharging circuit", boosts the voltage V1 of the external power supply 20 up to a charged voltage V3 of the first battery pack 121 and the second battery pack 122, and charges the battery unit 12 with the charged voltage V3. Further, when power failure of the external power supply 20 occurs, the charge/discharge circuit 13 discharges electric power from the battery unit 12 to the load device 30 via the input/output terminal 11. The charge/discharge circuit 13 includes a DC/DC converter 131, a first charging switch SW1, a first discharging switch SW2, a second charging switch SW3, and a second discharging switch SW4.

The DC/DC converter 131 is a voltage conversion unit which boosts the voltage V1 of the external power supply 20 up to the charging voltage V3 of each of the first battery pack 121 and the second battery pack 122. More specifically, the DC/DC converter 131 is a boost type DC/DC converter of an input-output insulation type.

The first charging switch SW1 is a switch for switching between a charging state and a non-charging state of the first battery pack 121. More specifically, one end side of the first charging switch SW1 is connected to the output of the DC/DC converter 131, and the other end side of the first charging switch SW1 is connected to the positive electrode of the first battery pack 121. The negative electrode of the first battery pack 121 is connected to the ground. When the first charging switch SW1 is turned on, the first battery pack 121 is charged with the output voltage (charging voltage V3) of the DC/DC converter 131.

The first discharging switch SW2 is a switch for switching between a discharging state and a non-discharging state of the first battery pack 121. More specifically, one end side of the first discharging switch SW2 is connected to the input/output terminal 11, and the other end side of the first discharging switch SW2 is connected to the positive electrode of the first battery pack 121. When the first discharging switch SW2 is turned on, the first battery pack 121 is brought into a state in which electric power of the first battery pack 121 can be discharged to the load device 30 via the input/output terminal 11, that is, the first battery pack 121 is brought into the discharge allowing state.

The second charging switch SW3 is a switch for switching between a charging state and a non-charging state of the second battery pack 122. More specifically, one end side of the second charging switch SW3 is connected to the output of the DC/DC converter 131, and the other end side of the second charging switch SW3 is connected to the positive electrode of the second battery pack 122. The negative electrode of the second battery pack 122 is connected to the ground. When the second charging switch SW3 is turned on, the second battery pack 122 is charged with the output voltage (charged voltage V3) of the DC/DC converter 131.

The second discharging switch SW4 is a switch for switching between a discharging state and a non-discharging state of the second battery pack 122. More specifically, one end side of the second discharging switch SW4 is connected to the input/output terminal 11, and the other end side of the second discharging switch SW4 is connected to the positive electrode of the second battery pack 122. When the second discharging switch SW4 is turned on, the second battery pack 122 is brought into a state in which electric power of the second battery pack 122 can be discharged to the load device 30 via the input/output terminal 11, that is, the second battery pack 122 is brought into the discharge allowing state.

The control unit 14 is a known microcomputer control unit which controls the charge/discharge circuit 13. More specifically, the control unit 14 performs on/off control of the first charging switch SW1, the first discharging switch SW2, the second charging switch SW3, and the second discharging switch SW4, on the basis of the voltage V21, the temperature, and the like, of the first battery pack 121, and on the basis of the voltage V22, the temperature, and the like, of the second battery pack 122.

Charge and Discharge Control of Uninterruptible Power Supply Unit 10

The charge and discharge control of the first battery pack 121 and the second battery pack 122, which is performed by the control unit 14, will be described with reference to FIG. 2.

Figure 2:
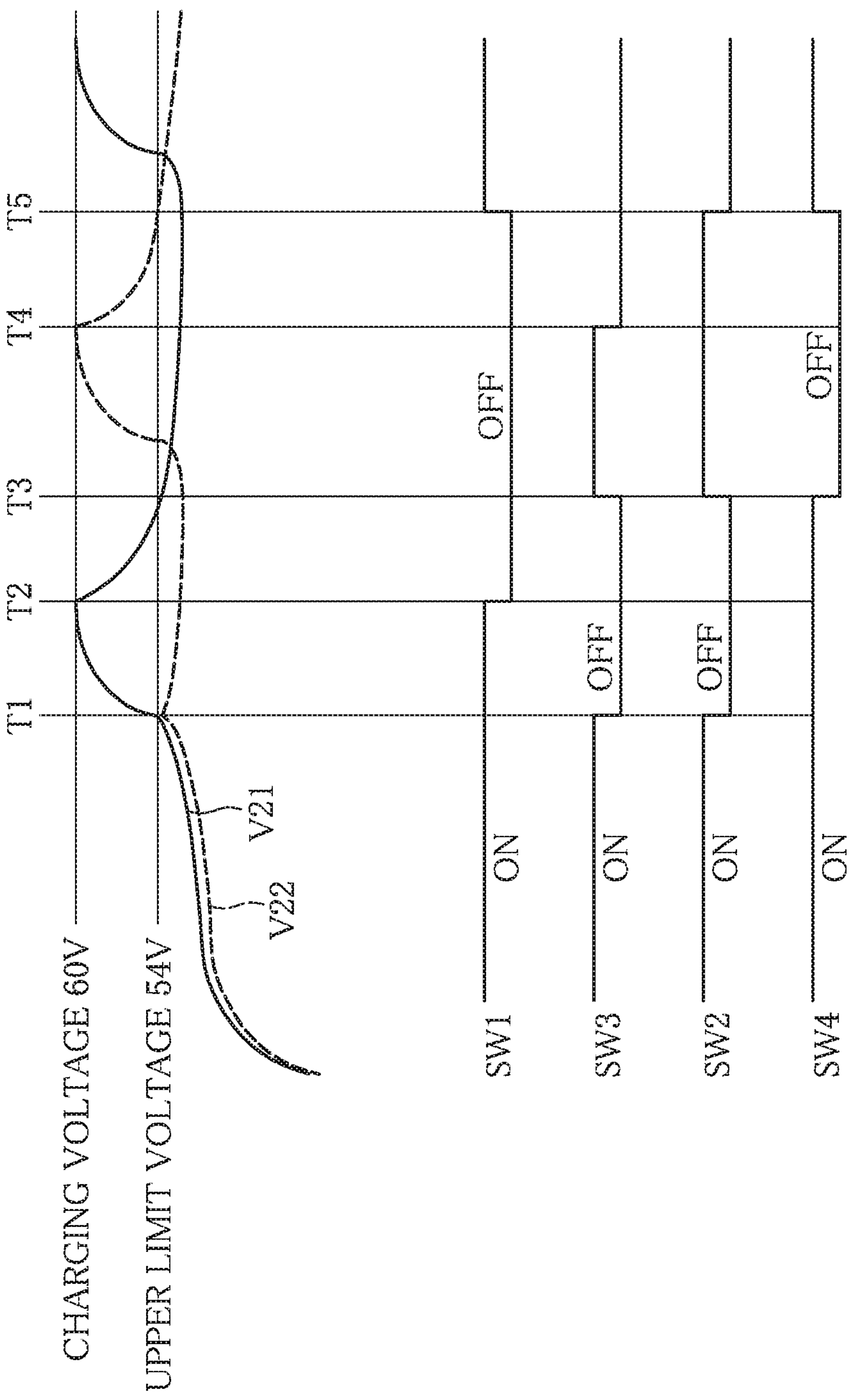
FIG. 2 is a timing chart illustrating charge and discharge control of the uninterruptible power supply unit according to an embodiment of the present invention.

FIG. 2 is a timing chart illustrating the charge and discharge control of the uninterruptible power supply unit 10. In the timing chart of FIG. 2, the voltage V21 of the first battery pack 121 is illustrated by the solid line, and the voltage V22 of the second battery pack 122 is illustrated by the broken line.

Here, as an example, each of the voltage V1 of the external power supply 20, the rated voltage of the first battery pack 121, and the rated voltage of the second battery pack 122 is set to 54 V. Further, the output voltage (charging voltage V3) of the DC/DC converter 131 is set to 60 V. Further, the load device 30 is an electronic device in which the operating voltage is 40 V to 56 V, and in which the lower and upper limit voltages are 40V and 54V, respectively.

On the condition that each of the voltage V21 of the first battery pack 121 and the voltage V22 of the second battery pack 122 is lower than the lower limit voltage (40 V) of the load device 30, until the voltage V21 of the first battery pack 121 and the voltage V22 of the second battery pack 122 become the upper limit voltage (54 V) of the load device 30, the first battery pack 121 and the second battery pack 122 are simultaneously charged, while the discharging of each of the first battery pack 121 and the second battery pack 122 is allowed. More specifically, until the voltage V21 of the first battery pack 121 and the voltage V22 of the second battery pack 122 become 54 V, all of the first charging switch SW1, the first discharging switch SW2, the second charging switch SW3, and the second discharging switch SW4 are turned on.

In this way, in the case where each of the voltage V21 of the first battery pack 121 and the voltage V22 of the second battery pack 122 is lower than the lower limit voltage of the load device 30, both of the first battery pack 121 and the second battery pack 122 are simultaneously charged, and thereby, the first battery pack 121 and the second battery pack 122 can be charged in a short time and efficiently. Further, during the charging, the discharging of each of the first battery pack 121 and the second battery pack 122 is allowed. Thereby, even when power failure occurs during the charging, electric power can be supplied to the load device 30.

When the voltage V21 of the first battery pack 121 and the voltage V22 of the second battery pack 122 become equal to the voltage V1 of the external power supply 20, the charging of the second battery pack 122 is stopped, while the charging of the first battery pack 121 is continued. Additionally, the discharging of the first battery pack 121 is prohibited, while the discharging of the second battery pack 122 is allowed. More specifically, when the voltage V21 of the first battery pack 121 and the voltage V22 of the second battery pack 122 become 54 V (timing T1), the first discharging switch SW2 and the second charging switch SW3 are turned off.

When the first battery pack 121 is charged to the fully charged state, the charging of the first battery pack 121 is stopped. More specifically, when the first battery pack 121 is charged to the fully charged state (timing T2), the first charging switch SW1 is turned off. Then, when, after the first battery pack 121 is charged to the fully charged state, the voltage V21 of the first battery pack 121 is lowered below the upper limit voltage (54 V) of the load device 30, the discharging of the first battery pack 121 is allowed, the discharging of the second battery pack 122 is prohibited, and the charging of the second battery pack 122 is started. More specifically, when the voltage V21 of the first battery pack 121 becomes below 54 V (timing T3), the first discharging switch SW2 and the second charging switch SW3 are turned on, and also, the second discharging switch SW4 is turned off.

That is, during the charging of the first battery pack 121, and until, after the first battery pack 121 is charged to the fully charged state, the voltage V21 of the first battery pack 121 is lowered below the upper limit voltage of the load device 30, the control unit 14 prohibits the discharging of the first battery pack 121 (turns off the first discharging switch SW2) and allows the discharging of the second battery pack 122 (turns on the second discharging switch SW4).

When the second battery pack 122 is charged to the fully charged state, the charging of the second battery pack 122 is stopped. More specifically, when the second battery pack 122 is charged to the fully charged state (timing T4), the second charging switch SW3 is turned off. Further, when, after the second battery pack 122 is charged to the fully charged state, the voltage V22 of the second battery pack 122 is lowered below the upper limit voltage (54 V) of the load device 30, the discharging of the second battery pack 122 is allowed, the discharging of the first battery pack 121 prohibited, and the charging of the first battery pack 121 is started. More specifically, when the voltage V22 of the second battery pack 122 becomes below 54 V (timing T5), the second discharging switch SW4 and the first charging switch SW1 are turned on, and also, the first discharging switch SW2 is turned off.

That is, during the charging of the second battery pack 122, and until, after the second battery pack 122 is charged to the fully charged state, the voltage V22 of the second battery pack 122 is lowered below the upper limit voltage of the load device 30, the control unit 14 prohibits the discharging of the second battery pack 122 (turns off the second discharging switch SW4) and allows the discharging of the first battery pack 121 (turns on the first discharging switch SW2).

In this way, the uninterruptible power supply unit 10 always maintains the state in which one of the first battery pack 121 and the second battery pack 122 is charged, and also the state in which the discharging of the other of the first battery pack 121 and the second battery pack 122 is allowed. That is, at power failure, the uninterruptible power supply unit 10 can always supply electric power to the load device 30 from one of the first battery pack 121 and the second battery pack 122, and hence, can surely continue the operation of the load device 30. Further, when electric power is supplied from the battery unit 12 to the load device 30 at power failure, the output voltage of the battery unit 12 (the voltage V21 of the first battery pack 121 and the voltage V22 of the second battery pack 122) is always below the upper limit voltage of the load device 30, and hence, stoppage, failure, and the like, of the load device 30 can be obviated. Further, at power failure, electric power can be directly supplied from the battery unit 12 to the load device 30, and hence, the electric power of the battery unit 12 can be efficiently used.

In this way, according to embodiments of the present invention, it is possible to provide the uninterruptible power supply unit 10 which can efficiently use electric power of the secondary battery.

Further, it is preferred that, when the discharging of the first battery pack 121 is allowed at power failure, the uninterruptible power supply unit 10 allows discharging of the second battery pack 122 on the condition that the voltage V21 of the first battery pack 121 is lowered below the lower limit voltage of load device 30. Similarly, it is preferred that, when the discharging of the second battery pack 122 is allowed at power failure, the uninterruptible power supply unit 10 allows discharging of the first battery pack 121 on the condition that the voltage V22 of the second battery pack 122 is lowered below the lower limit voltage of load device 30. This configuration is not essential, but with this configuration, the opportunity of additional charging of the first battery pack 121 or the second battery pack 122 can be reduced, and thereby, the possibility of occurrence of temporary voltage drop caused by the memory effect of the battery unit 12 can be reduced.

Modification

A modification of the uninterruptible power supply unit 10 according to an embodiment of the present invention will be described with reference to FIG. 3.

Figure 3:
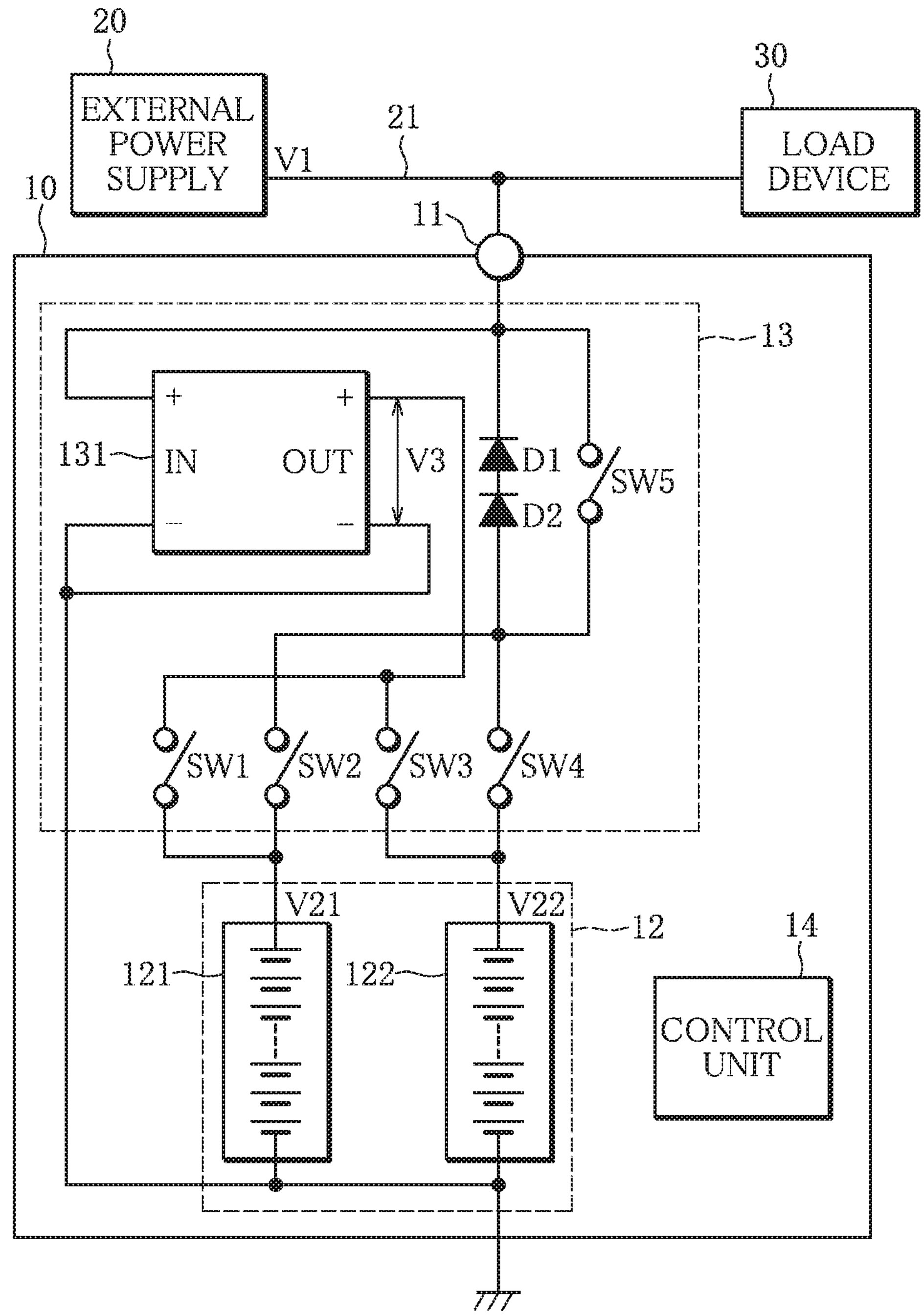
FIG. 3 is a circuit diagram illustrating a configuration of a modification of the uninterruptible power supply unit according to an embodiment of the present invention.

FIG. 3 is a circuit diagram illustrating the configuration of a modification of the uninterruptible power supply unit 10.

The configuration of the modification of the uninterruptible power supply unit 10 is the same as that of the uninterruptible power supply unit 10 shown in FIG. 1 except for the configuration of the charge/discharge circuit 13. The common components are denoted by the same reference numerals and characters, and hence the detailed description thereof will be omitted. More specifically, a charge/discharge circuit 13 of the modification is further provided with diodes D1 and D2, and a bypass switch SW5 in addition to the charge/discharge circuit 13 shown in FIG. 1.

The diode D1 and D2 are connected in series. The cathode of the diode D1 is connected to the input/output terminal 11. The anode of the diode D2 is connected to each of the positive electrodes of the first battery pack 121 and the second battery pack 122 via each of the first discharging switch SW2 and the second discharging switch SW4. That is, the diodes D1 and D2 are provided in the discharge path from the battery unit 12 to the input/output terminal 11, and are semiconductor elements which lower the voltage of the battery unit 12.

One end of the bypass switch SW5 as a "bypass circuit" is connected to the cathode of the diode D1, and the other end of the bypass switch SW5 is connected to the anode of the diode D2. That is, the bypass switch SW5 is a switch which bypasses the diodes D1 and D2 in the discharge path from the battery unit 12 to the input/output terminal 11. The bypass switch SW5 is on/off controlled by the control unit 14.

As described above, on the condition that each of the voltage V21 of the first battery pack 121 and the voltage V22 of the second battery pack 122 is below the lower limit voltage (40 V) of the load device 30, the control unit 14 simultaneously charges the first battery pack 121 and the second battery pack 122 and allows discharging of the first battery pack 121 and the second battery pack 122 until the voltage V21 of the first battery pack 121 and the voltage V22 of the second battery pack 122 become the upper limit voltage (54 V) of the load device 30. When, in the state in which the first battery pack 121 and the second battery pack 122 are simultaneously charged, and in which the discharging of the first battery pack 121 and the second battery pack 122 is allowed, the voltage V21 of the first battery pack 121 and the voltage V22 of the second battery pack 122 become the upper limit voltage (54 V) of the load device 30, the charge/discharge circuit 13 shown in FIG. 1 cannot further charge the first battery pack 121 and the second battery pack 122.

On the other hand, in the charge/discharge circuit 13 (FIG. 3) of the modification, the voltage drop of about 1 V is arisen in the diodes D1 and D2. Therefore, in the state in which the bypass switch SW5 is turned off, the voltage V21 of the first battery pack 121 and the voltage V22 of the second battery pack 122 can be lowered by about 1 V at the input/output terminal 11. Thereby, the charge/discharge circuit 13 of the modification can charge the first battery pack 121 and the second battery pack 122 until the voltage V21 of the first battery pack 121 and the voltage V22 of the second battery pack 122 become higher than the upper limit voltage (54 V) of the load device 30 by the voltage drop (about 1 V) arisen in the diodes D1 and D2.

That is, in the state in which the discharging of each of the first battery pack 121 and the second battery pack 122 is allowed until the voltage V21 of the first battery pack 121 and the voltage V22 of the second battery pack 122 become about 55 V, the charge/discharge circuit 13 of the modification can simultaneously charge the first battery pack 121 and the second battery pack 122. Thereby, the charging time of the first battery pack 121 and the second battery pack 122 can be increased, and hence, the charge/discharge circuit 13 of the modification can more effectively charge the first battery pack 121 and the second battery pack 122.

Further, when electric power of the battery unit 12 is supplied to the load device 30 at power failure, the control unit 14 turns on the bypass switch SW5 to bypass the diodes D1 and D2. Thereby, it is possible to avoid that, at power failure, electric power of the battery unit 12 cannot be efficiently used due to the voltage drop and power loss which are arisen in the diodes D1 and D2.

EXPLANATION OF REFERENCE SIGNS

10 Uninterruptible power supply unit
11 Input/output terminal
12 Battery unit
13 Charge/discharge circuit
14 Control unit
20 External power supply
30 Load device
121 First battery pack
122 Second battery pack
131 DC/DC converter
D1, D2 Diode
SW1 First charging switch
SW2 First discharging switch
SW3 Second charging switch
SW4 Second discharging switch
SW5 Bypass switch

The invention claimed is:

1. An uninterruptible power supply unit comprising:

an input/output terminal which is connected in parallel with a power supply line supplying electric power from an external power supply to a load device;

a battery unit including a first battery pack and a second battery pack, each of which has a rated voltage equal to a voltage of the external power supply;

a charging circuit which boosts the voltage of the external power supply to a charging voltage of the first battery pack and the second battery pack, and charges the battery unit with the boosted charging voltage, the charging circuit including a first charging switch connected to the first battery pack and a second charging switch connected to the second battery pack;

a discharging circuit which, in response to power failure of the external power supply, discharges electric power from the battery unit to the load device via the input/output terminal, the discharging circuit including a first discharging switch connected to the first battery pack and a second discharging switch connected to the second battery pack; and a control unit which controls the charging circuit and the discharging circuit by selectively switching the first charging switch, the first discharging switch, the second charging switch and the second discharging switch, wherein, during charging of the first battery pack, and until, after the first battery pack is charged to a fully charged state, the voltage of the first battery pack is lowered below an upper limit voltage of the load device, the control unit prohibits discharging of the first battery pack by opening the first discharging switch and allows discharging of the second battery pack by closing the second discharging switch, and during charging of the second battery pack, and until, after the second battery pack is charged to a fully charged state, the voltage of the second battery pack is lowered below the upper limit voltage of the load device, the control unit prohibits discharging of the second battery pack by opening the second discharging switch and allows discharging of the first battery pack by closing the first discharging switch.

2. The uninterruptible power supply unit according to claim 1, wherein, on a condition that each of the voltage of the first battery pack and the voltage of the second battery pack is lower than the lower limit voltage of the load device, until the voltage of the first battery pack and the voltage of the second battery pack reach the upper limit voltage of the load device, the control unit simultaneously charges the first battery pack and the second battery pack by closing the first charging switch and the second charging switch and allows discharging of the first battery pack and the second battery pack by closing the first discharging switch and the second discharging switch.

3. The uninterruptible power supply unit according to claim 2, wherein the discharging circuit further includes: a semiconductor element which is provided in a discharge path from the battery unit to the input/output terminal and lowers the voltage of the battery unit; and a bypass circuit which bypasses the semiconductor element.

4. The uninterruptible power supply unit according to claim 1, wherein: in a state where, at power failure, and discharging of the first battery pack is allowed, on a condition that the voltage of the first battery pack is lowered below the lower limit voltage of the load device, the control unit allows discharging of the second battery pack by closing the second discharging switch; and in a state where, at power failure, and discharging of the second battery pack is allowed, on a condition that the voltage of the second battery pack is lowered below the lower limit voltage of the load device, the control unit allows discharging of the first battery pack by closing the first discharging switch.

5. The uninterruptible power supply unit according to claim 2, wherein: in a state where, at power failure, and discharging of the first battery pack is allowed, on a condition that the voltage of the first battery pack is lowered below the lower limit voltage of the load device, the control unit allows discharging of the second battery pack by closing the second discharging switch; and in a state where, at power failure, and discharging of the second battery pack is allowed, on a condition that the voltage of the second battery pack is lowered below the lower limit voltage of the load device, the control unit allows discharging of the first battery pack by closing the first discharging switch.

6. The uninterruptible power supply unit according to claim 3, wherein: in a state where, at power failure, and discharging of the first battery pack is allowed, on a condition that the voltage of the first battery pack is lowered below the lower limit voltage of the load device, the control unit allows discharging of the second battery pack by closing the second discharging switch; and in a state where, at power failure, and discharging of the second battery pack is allowed, on a condition that the voltage of the second battery pack is lowered below the lower limit voltage of the load device, the control unit allows discharging of the first battery pack by closing the first discharging switch.

7. An uninterruptible power supply unit comprising:

an input/output terminal which is connected in parallel with a power supply line supplying electric power from an external power supply to a load device;

a battery unit including a first battery pack and a second battery pack, each of which has a rated voltage equal to a voltage of the external power supply;

a direct current to direct current (DC/DC) converter which boosts the voltage of the external power supply to a charging voltage of the first battery pack and the second battery pack;

a charging circuit including a first switch electrically coupled between the first battery pack and the DC/DC converter and a second switch electrically coupled between the second battery pack and the DC/DC converter;

a discharging circuit including a third switch electrically coupled between the first battery pack and the input/output terminal and a fourth switch electrically coupled between the second battery pack and the input/output terminal;

a control unit configured to:

control the charging circuit to charge the battery unit with the boosted charging voltage by closing the first switch to charge the first battery pack and closing the second switch to charge the second battery pack, control the discharging circuit to discharge electric power from the battery unit to the load device via the input/output terminal, in response to power failure of the external power supply, by closing the third switch to discharge the first battery pack and closing the fourth switch to discharge the second battery pack, prohibit discharging of the first battery pack by opening the third switch during charging of the first battery pack until the first battery pack has reached a fully charged start and the voltage of the first battery pack is lowered below an upper limit voltage of the load device, allow discharging of the second battery pack by closing the fourth switch during charging of the first battery pack, prohibit discharging of the second battery pack by opening the fourth switch during charging of the second battery pack until the second battery pack has reached a fully charged start and the voltage of the second battery pack is lowered below an upper limit voltage of the load device, and allow discharging of the first battery pack by closing the third switch during charging of the second battery pack.

8. The uninterruptible power supply unit according to claim 7, wherein the control unit is further configured to simultaneously charge the first and second battery packs and allow discharging of the first and second battery packs by closing the first, second, third and fourth switches, on a condition that each of the voltage of the first battery pack and the voltage of the second battery pack is lower than the lower limit voltage of the load device, until the voltage of the first battery pack and the voltage of the second battery pack reach the upper limit voltage of the load device.

9. The uninterruptible power supply unit according to claim 8, wherein the discharging circuit further includes: a semiconductor element which is provided in a discharge path from the battery unit to the input/output terminal and lowers the voltage of the battery unit; and a bypass circuit which bypasses the semiconductor element.

10. The uninterruptible power supply unit according to claim 7, wherein the control unit is further configured to allow discharging of the first battery pack in a state where, at power failure, and discharging of the first battery pack is allowed, on a condition that the voltage of the first battery pack is lowered below the lower limit voltage of the load device, the control unit allows discharging of the second battery pack by closing the fourth switch; and in a state where, at power failure, and discharging of the second battery pack is allowed, on a condition that the voltage of the second battery pack is lowered below the lower limit voltage of the load device the control unit allows discharging of the first battery pack by closing the third switch.

11. The uninterruptible power supply unit according to claim 8, wherein the control unit is further configured to allow discharging of the first battery pack in a state where, at power failure, and discharging of the first battery pack is allowed, on a condition that the voltage of the first battery pack is lowered below the lower limit voltage of the load device, the control unit allows discharging of the second battery pack by closing the fourth switch; and in a state where, at power failure, and discharging of the second battery pack is allowed, on a condition that the voltage of the second battery pack is lowered below the lower limit voltage of the load device the control unit allows discharging of the first battery pack by closing the third switch.

* * * * *